United States Patent
DeCrescenzo et al.

(10) Patent No.: US 9,306,941 B2
(45) Date of Patent: Apr. 5, 2016

(54) LOCAL, PAPERLESS DOCUMENT SHARING, EDITING, AND MARKING SYSTEM

(71) Applicant: Exhibeo, LLC, Cherry Hill, NJ (US)

(72) Inventors: James DeCrescenzo, Cherry Hill, NJ (US); Matthew McElvenny, Philadelphia, PA (US)

(73) Assignee: Exhibeo, LLC, Cherry Hill, NJ (US)

( * ) Notice: Subject to any disclaimer, the term of this patent is extended or adjusted under 35 U.S.C. 154(b) by 0 days.

(21) Appl. No.: 14/835,251

(22) Filed: Aug. 25, 2015

(65) Prior Publication Data

US 2016/0065561 A1    Mar. 3, 2016

Related U.S. Application Data

(60) Provisional application No. 62/041,984, filed on Aug. 26, 2014.

(51) Int. Cl.
*H04L 29/06* (2006.01)
*G06F 17/24* (2006.01)
*G06F 17/30* (2006.01)

(52) U.S. Cl.
CPC ............ *H04L 63/083* (2013.01); *G06F 17/241* (2013.01); *G06F 17/30011* (2013.01); *H04L 63/10* (2013.01); *H04L 65/403* (2013.01)

(58) Field of Classification Search
CPC ...... H04L 63/083; H04L 63/10; H04L 65/403; G06F 17/30011; G06F 17/241
See application file for complete search history.

(56) References Cited

U.S. PATENT DOCUMENTS

| | | | |
|---|---|---|---|
| 2005/0262435 A1* | 11/2005 | Ramanujan | G06F 9/543 715/234 |
| 2006/0010379 A1* | 1/2006 | Kashi | G06F 9/543 715/234 |
| 2014/0096178 A1* | 4/2014 | Shippy | G06F 21/316 726/1 |
| 2014/0280061 A1* | 9/2014 | Elkhou | G06F 17/30011 707/722 |
| 2015/0095315 A1* | 4/2015 | DeCrescenzo | G06F 3/04815 707/722 |

* cited by examiner

*Primary Examiner* — Amir Mehrmanesh
(74) *Attorney, Agent, or Firm* — Pepper Hamilton LLP

(57) ABSTRACT

Embodiments are directed to a local, paperless document sharing, editing, and marking system which allows users connected to a local network to share, view, edit, mark, and save documents without needing to download them from an internet-based cloud server. A router is used to create a secure, local network to which all participants connect. A user selects documents from a drive connected to the router and shares those documents with other attendees, allowing the attendees to edit, save, and share the documents, mark the documents as exhibits to a legal proceeding, save the documents to a drive, and/or email the documents.

12 Claims, 26 Drawing Sheets

| | | |
|---|---|---|
| iPad 📶 | 3:24 PM | 77% 🔋 ⏻ |
| | ROUTER | Safely remove drive |
| 📶 Router | Sort by [Type ⌄] [Refresh ↻] | Select All ○ |
| ↥ Downloaded Files | 📄 PLTF-001 annotated.pdf | 07-07-2015 ○ |
| ◉ Shared Files | 📄 PLTF-007.pdf | 07-07-2015 ○ |
| 📄 Leader's Files | 📄 PLTF-006.pdf | 07-07-2015 ○ |
| ☑ Marked Exhibits | 📄 PLTF-003 annotated.pdf | 07-07-2015 ○ |
| ☰ Authentication Requests | 📄 PLTF-005.pdf | 07-07-2015 ○ |
| 👤 Authenticated Users | 📄 PLTF-005 annotated.pdf | 07-07-2015 ○ |
| | 📄 PLTF-003.pdf | 07-07-2015 ○ |
| | 📄 PLTF-011.pdf | 07-07-2015 ○ |
| | 📄 P009_MRI_2013-Jan_02.png | 05-04-2015 ○ |
| | 📄 P008_MRI_2013-Jan_01.png | 05-04-2015 ○ |
| | 📄 P007_MRI_2005_02.png | 05-04-2015 ○ |
| | 📄 P006_MRI_2005_01.png | 05-04-2015 ○ |
| | 📄 truckCompare.swf | 02-26-2014 ○ |
| | | [Download] |

1200

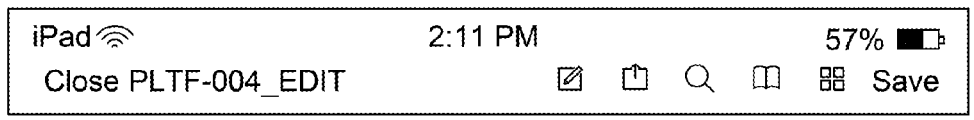

UNITED STATES DISTRICT COURT
NORTHERN DISTRICT OF
CALIFORNIA
SAN JOSE DIVISION

JOHN DOE

Plaintiff, v.

Case No.:1-CV-1111

JAMES SMITH
    Defendant.

On August 28, 2012, after extended discussion with the parties, this Court issued a carefully considered Order setting a briefing schedule and page limits for all of the post-trial briefing in this case ("Scheduling Order"). ECF No. 1945. In the Scheduling Order, the Court limited the briefing for Mr. Smith's motion for permanent injunction and willfulness enhancements to 30 pages for the opening brief, 35 pages for Mr. Doe's opposition, and 15 pages for Mr. Smith's reply.

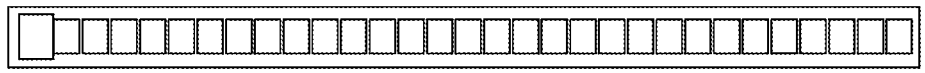

FIG. 12

2000 iPad 📶　　　10:47 AM　　　　　　　　　　　　　　　100% 🔋 ⏻

MARKED EXHIBITS

| ⊙ Shared Files | Sort by [Name ⌄] | | Select All ○ |
| --- | --- | --- | --- |
| ⬇ Downloaded Files | 📄 Smith-1 MS 07-17-15.pdf | 07-17-2015 | ⊙ |
| 📄 Guest's Files | 📄 Smith-2 MS 07-17-15.pdf | 07-17-2015 | ⊙ |
| ☑ Marked Exhibits | 📄 Smith-3 MS 07-17-15.pdf | 07-17-2015 | ⊙ |
| | 📄 Smith-4 MS 07-17-15.pdf | 07-17-2015 | ⊙ |

[ E-mail ]

| iPad 📶 | 2:11 PM | 85% 🔋 |
|---|---|---|
| Close | PLTF-004_EDIT  ⎙  🔍  📖  ⊞  Save | |

UNITED STATES DISTRICT COURT
NORTHERN DISTRICT OF
CALIFORNIA
SAN JOSE DIVISION

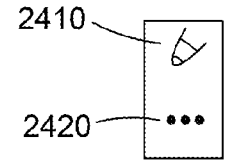

2410

2420

JOHN DOE

Plaintiff, v.

Case No.:1-CV-1111

JAMES SMITH
    Defendant.

On August 28, 2012, after extended discussion with the parties, this Court issued a carefully considered Order setting a briefing schedule and page limits for all of the post-trial briefing in this case ("Scheduling Order"). ECF No. 1945. In the Scheduling Order, the Court limited the briefing for Mr. Smith's motion for permanent injunction and willfulness enhancements to 30 pages for the opening brief, 35 pages for Mr. Doe's opposition, and 15 pages for Mr. Smith's reply.

1 of 112

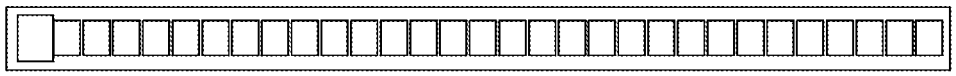

FIG. 24

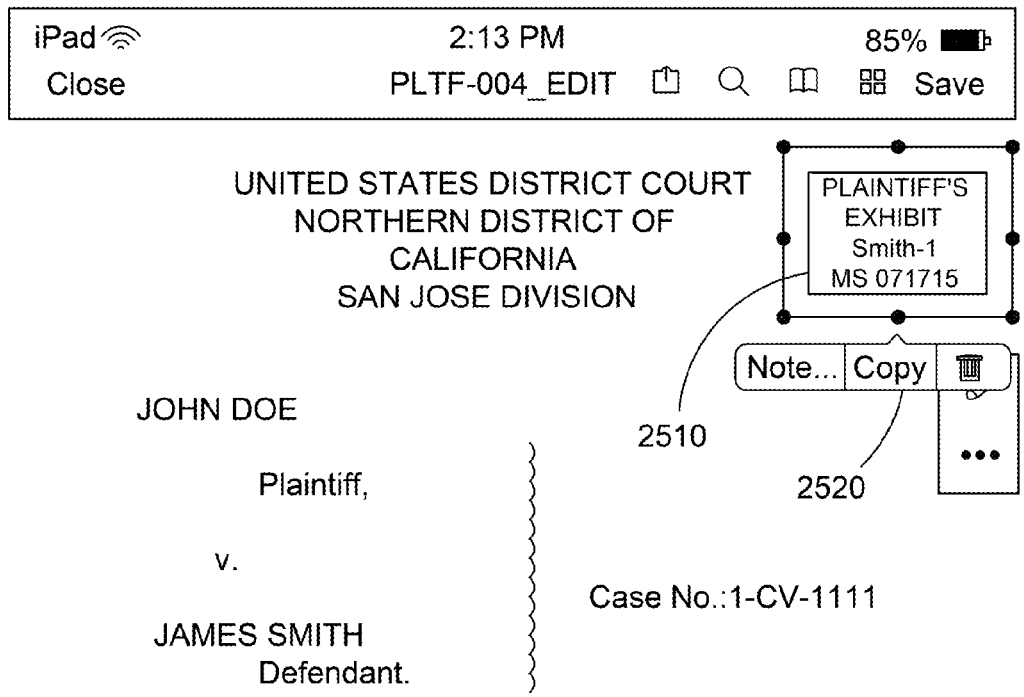
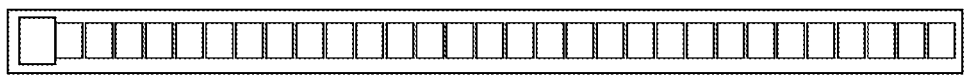
FIG. 25

2600 iPad

10:51 AM 100%

MARKED EXHIBITS

| Downloaded Files | Sort by Name ⌄ | Select All |
|---|---|---|
| ☑ Marked Exhibits | Smith-1 MS 07-17-15.pdf | 07-17-2015 ⟩ |
| ☑ Exhibit Sticker | Smith-2 MS 07-17-15.pdf | 07-17-2015 ⟩ |
| | Smith-3 MS 07-17-15.pdf | 07-17-2015 ⟩ |
| | Smith-4 MS 07-17-15.pdf | 07-17-2015 ⟩ |
| | Smith-5 MS 07-17-15.pdf | 07-17-2015 ⟩ |

E-mail      Save to USB

FIG. 26

LOCAL, PAPERLESS DOCUMENT SHARING, EDITING, AND MARKING SYSTEM

CROSS-REFERENCE TO RELATED APPLICATIONS

This application claims priority to U.S. Provisional Patent Application No. 62/041,984, filed on Aug. 26, 2014 and entitled "Local, Paperless Document Sharing, Editing, and Marking System," the contents of which are herein included by reference in their entirety.

BACKGROUND

In an environment in which document sharing is required or desired, such as in a legal environment where documents including exhibits are going to be used at a deposition, the usual method of document sharing involves distribution of copies of paper documents. Sufficient numbers of copies must be located, printed, organized, collated, and shipped for use. There is time and expense involved in creating these copies and logistical difficulties in transporting what could be multiple boxes of documents.

There have been some attempts to share documents electronically, eliminating paper copies. These electronic solutions involve storing electronic versions of the documents on internet-based cloud servers. These servers are outside the possession and control of the users. In one example, the taker of a deposition downloads a copy of a document to their tablet or computing device; they then allow the other participants in the room to download and view the documents from the server.

This electronic cloud-based solution has drawbacks. First, it is bound only to devices that can access the internet via Wi-Fi or broadband connections. If a deposition, for example, is held in a location with limited or non-existent internet access, participants may be unable to download documents.

Even in a location with good internet service, users still must download documents from a cloud-based service. Different internet providers may have different broadband speeds at the same location, resulting in some participants getting a document before others. For example, a document that is 10 Mb in size may take as long as two minutes to retrieve from a cloud server. Any time spent downloading documents from a web host is time lost.

Additionally, cloud-based service users incur ongoing costs. Web host servers often charge fees for hosting documents on their servers. They may also charge a fee every time a document is downloaded or accessed. Moreover, governments have begun implementing "cloud" use taxes, adding even more cost to the cloud-based services.

Lastly, there are security issues that arise from cloud-based services, as hacking and other security breaches are common.

Thus, a non-cloud-based electronic system for securely sharing documents is desired.

SUMMARY

Embodiments disclosed herein are directed to a local, paperless document sharing, editing, and marking system.

In an embodiment, a system for allowing a plurality of user devices to connect to share, view, edit, mark, and save documents over a local network is provided. The system includes: a router configured to create the local network between the plurality of user devices, the plurality of user devices comprising a leader device authenticated by the router and one or more participant devices approved by the leader device to join the local network; and a document storage device connected to the router and containing thereon one or more documents. The router and the document storage device are configured to provide access to the one or more documents contained on the document storage device when an application installed on the plurality of devices is run, the application configured to provide a leader graphical user interface (GUI) on the leader device for allowing leader manipulation of at least one of the one or more documents and sharing of at least one of the one or more documents with the participant devices, and a participant GUI on the one or more participant devices for allowing participant manipulation of at least one of the shared documents.

In another embodiment, a computer-implemented method for allowing a plurality of user devices to connect to share, view, edit, mark, and save documents over a local network is provided. The method comprises: creating, via a router, the local network between the plurality of user devices, the plurality of user devices comprising a leader device and one or more participant devices approved by the leader device to join the local network; connecting to the router a document storage device containing thereon one or more documents; authenticating, by the router, the leader device; and providing, by the router and the document storage device, access to the one or more documents contained on the document storage device when an application installed on the plurality of devices is run, the application configured to provide a leader graphical user interface (GUI) on the leader device for allowing leader manipulation of at least one of the one or more documents and sharing with the participant devices of at least one of the one or more documents, and a participant GUI on the one or more participant devices for allowing participant manipulation of at least one of the shared documents.

In an embodiment, the leader device authentication by the router comprises verification of a secure password specific to the router.

According to an embodiment, the local network comprises a wireless network broadcasted by the router, and the document storage device is preconfigured for access of the one or more documents.

According to an embodiment, leader manipulation of at least one of the one or more documents comprises one or more of selecting, editing, annotating, saving, downloading, and viewing the at least one of the one or more documents.

In another embodiment, the leader GUI comprises one or more windows for one or more of selecting, editing, saving, sharing, downloading, and viewing the at least one of the one or more documents.

According to an embodiment, participant manipulation of the at least one of the shared documents comprises one or more of selecting, editing, annotating, saving, downloading, and viewing the at least one of the shared documents.

In an embodiment, the participant GUI is based upon one or more predefined participant types, each participant type provided with a specified functionality in a corresponding participant GUI. According to an embodiment, a first predefined participant type comprises a court reporter, wherein a corresponding court reporter GUI comprises one or more windows for one or more of customizing exhibit stickers, saving exhibit stickers, marking and saving one or more of the at least one of the shared documents, and sharing one or more of the at least one of the shared documents. In an embodiment, a second predefined participant type comprises a guest user, wherein a corresponding guest user GUI comprises one or more windows for one or more of selecting, editing, saving, sharing, downloading, and viewing one or more of the at least one of the shared documents

BRIEF DESCRIPTION OF THE DRAWINGS

The foregoing and other aspects of the invention are best understood from the following detailed description when read in connection with the accompanying drawings. The drawings depict embodiments solely for the purpose of illustration; it should be understood, however, that the disclosure is not limited to the specific instrumentalities disclosed. Included in the drawings are the following Figures:

FIGS. 7-26 are screenshots of a graphical user interface for a local, paperless document sharing, editing, and marking system, according to an embodiment.

DETAILED DESCRIPTION

Embodiments provided herein are directed to a local, paperless document sharing, editing, and marking system which allows users connected to a local, secure network to share, view, edit, mark, and save documents without needing to download them from an internet-based cloud server.

Although embodiments herein are described with respect to a legal, and in particular a deposition, environment, the system is not limited to such an environment. Instead, the system is applicable for any environment in which users wish to securely share documents with one another or with multiple participants.

Figure 1:
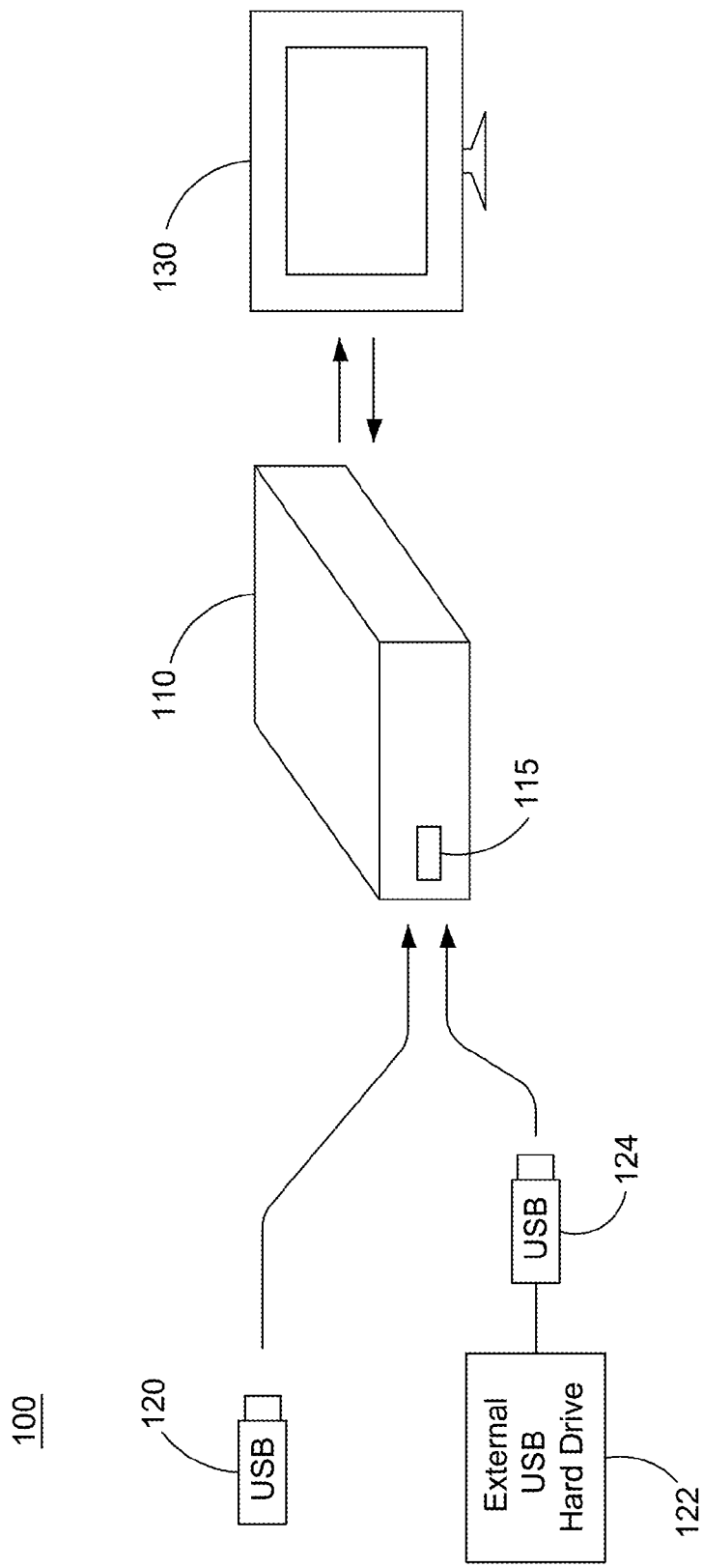
FIGS. 1 and 2 are system diagrams illustrating hardware components of a local, paperless document sharing, editing, and marking system, according to an embodiment.
Figure 2:
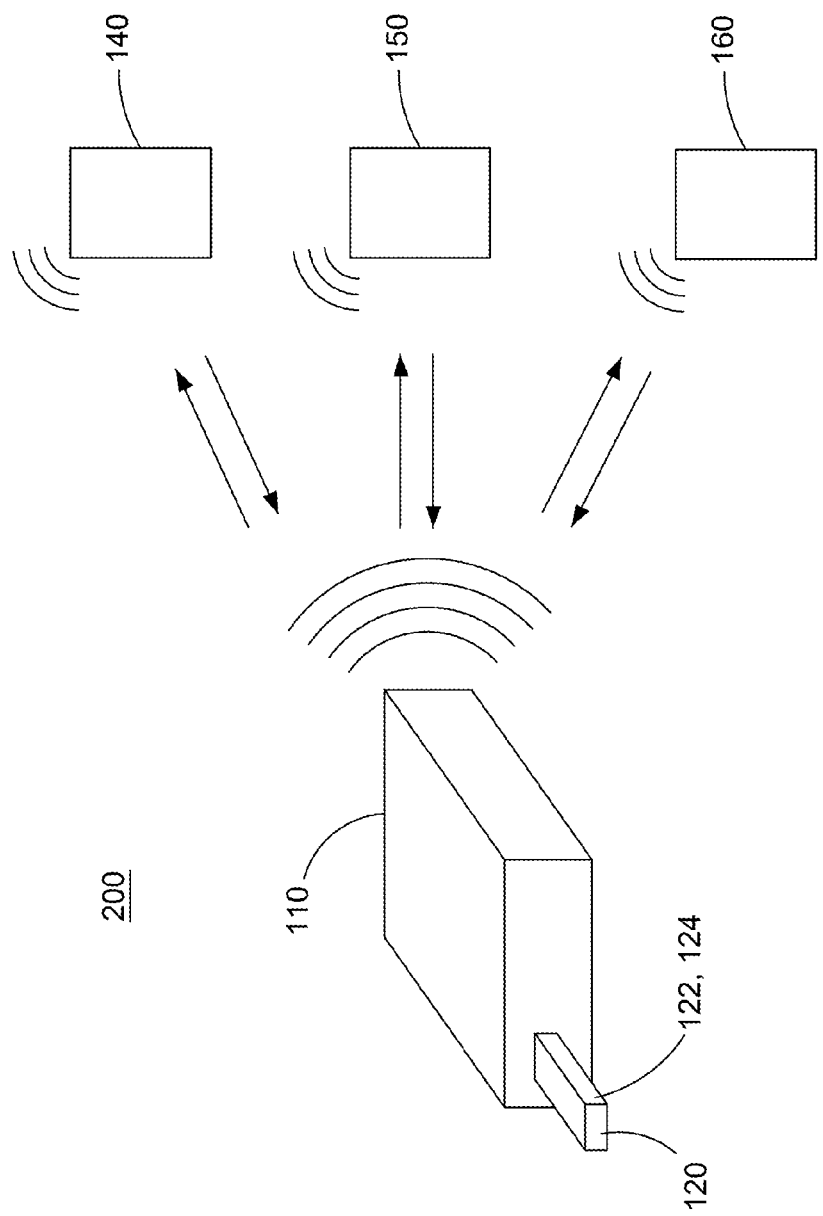

With reference to FIGS. 1 and 2, hardware components of a local, paperless document sharing, editing, and marking system, according to embodiments provided herein, are shown. A router 110 is used to create a local, secure network to which all participants connect via their respective devices 140, 150, 160 (see system 200 of FIG. 2). A document storage device, such as a USB 120 or an external USB hard drive 122 and a USB 124, is connected to the router 110 via a port 115 (see 100 of FIG. 1). The document storage device 120 or 122, 124 contains files or documents for sharing among the participants. Other types of document storage devices may be utilized. The router 110, in one embodiment, broadcasts a wireless network and is preconfigured for access (e.g., FTP access) of media (e.g., documents) from the connected document storage device 120/122, 124.

The router 110 is configured by connection with an internet accessible device, such as a processing device 130. The router 110 is preconfigured with a unique wireless network name and password. The device 130 connects to the router 110 using the unique wireless network name (e.g., an IP address) and password. The router 110 may be configured with SSID, security, FTP, or the like. The storage device 120/122, 124 is configured through the router to allow a specific user with a specific password to access the media contained on the document storage device 120/122, 124. Moreover, the storage device 120/122, 124 is configured so that a partition of the storage device 120/122, 124 is locked and accessible only to a user with the specific password for the device. In an embodiment, a storage device 120/122, 124 may have a partition that is publicly accessible to allow files to be accessed and/or saved from other user's devices to a personal thumb-drive, for example.

In an embodiment, the router 110 and the document storage device 120/122, 124 are preconfigured to work with an application installed on the participants' devices 140, 150, 160 (such as a tablet, smartphone, computer, or the like) connected to the local network created by the router 110. Participants of the system 200 join the network from their respective devices 140, 150, 160 via selection of the network being broadcasted by the router 110. One user, according to an embodiment and described in greater detail below, may be provided with a unique password that grants access to the document storage device 120/122, 124. This unique password, according to an embodiment, is the same as the specific password described above. The application being run on the user's device communicates with the router 110 to authenticate the user.

The application installed on the participants' devices 140, 150, 160, when run, provides a graphical user interface (GUI) that allows for user selection and manipulation of the documents from the document storage device 120/122, 124. In one embodiment, the user with the unique password for access to the documents may be considered as the "leader" and is presented with a leader GUI for manipulation and selection of the documents to be shared with participant devices (i.e., "participants"). The participants are presented with a participant GUI for viewing and manipulation of the shared documents. In one embodiment, the leader selects and authenticates the desired participants.

In an embodiment, a user selects, through the GUI, documents from the document storage device 120/122, 124 connected to the router 110 and shares those documents with other participants, allowing the participants to edit and share the documents, mark the documents (e.g., as exhibits to a legal proceeding), save the documents to a drive, and/or email the documents. According to an embodiment, the documents and/or marked documents may be saved for subsequent sessions or may be deleted upon the end of a session. According to an embodiment, documents may be marked with various tags (e.g., plaintiff's exhibit, defendant's exhibit, or customizable exhibit tags).

Legal Environment Example:

According to an exemplary embodiment with respect to the legal environment, the local, paperless document sharing, editing, and marking system 200 utilizes three defined parties: a leader, one or more guests, and a court reporter. In one example for a legal deposition, the leader is the person who will begin questioning a witness, the guests are the witness and other counsel or attendees to the proceeding, and there is one court reporter.

The leader is provided with the router 110 that creates the local network to which all participants connect via their respective devices 140 (the leader device), 150 (the guest device), 160 (the court reporter device). The leader utilizes the document storage device 120/122, 124 to store documents for sharing. In an embodiment, the router 110 and the document storage device 120/122, 124 are preconfigured to work with an application installed on the leader's device 140 (such as a tablet, smartphone, computer, or the like) connected to the local network created by the router 110. The leader is provided with a unique password that grants access to the document storage device 120/122, 124.

The leader begins a session and views documents he or she brings to the deposition via the document storage device 120/122, 124. The leader is able to share documents with participants in the deposition including guests and a court reporter. Documents may also be marked as exhibits by a court reporter, by affixing an electronic exhibit sticker to the document. This marked exhibit may be automatically shared with the participants in the room. Guests will be able to view and annotate documents and marked exhibits, as well as share annotated copies with the other participants. Each participant type has different permissions and interactions with the system, as described in detail below.

A leader can access, view, download, annotate, save, and share documents that reside on document storage device 120/122, 124 connected to the router 110. Once the leader downloads a document to his device, he can view, edit, and/or save the document on his device. He can then decide to share the document with the deposition participants.

A guest is able to receive and view documents shared by the leader. Once they have received the document on their tablet (or other computing device), they can annotate the documents and save the annotated documents. A guest is also able to share their annotations with the rest of the participants in the deposition; for example, in the case of a witness circling a part of a diagram or picture. That document can then be marked as an exhibit and saved for inclusion with the printed transcript.

A court reporter can receive and affix an electronic exhibit sticker to a document. Once affixed, that document may then be automatically shared with all the connected participants in the room.

Figure 3:
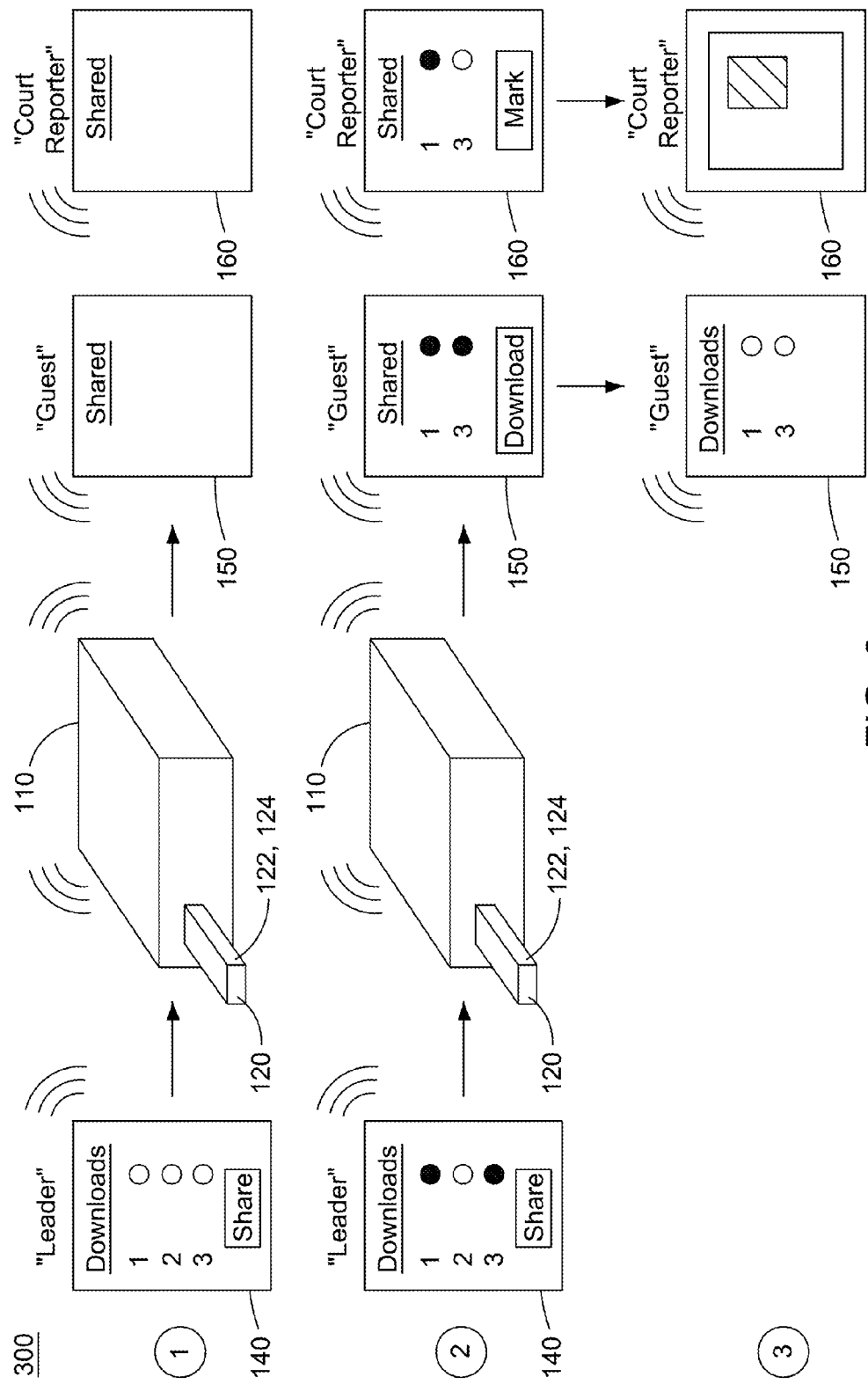
FIGS. 3 and 4 illustrate a series of steps for utilizing aspects of a local, paperless document sharing, editing, and marking system, according to an embodiment.
Figure 4:
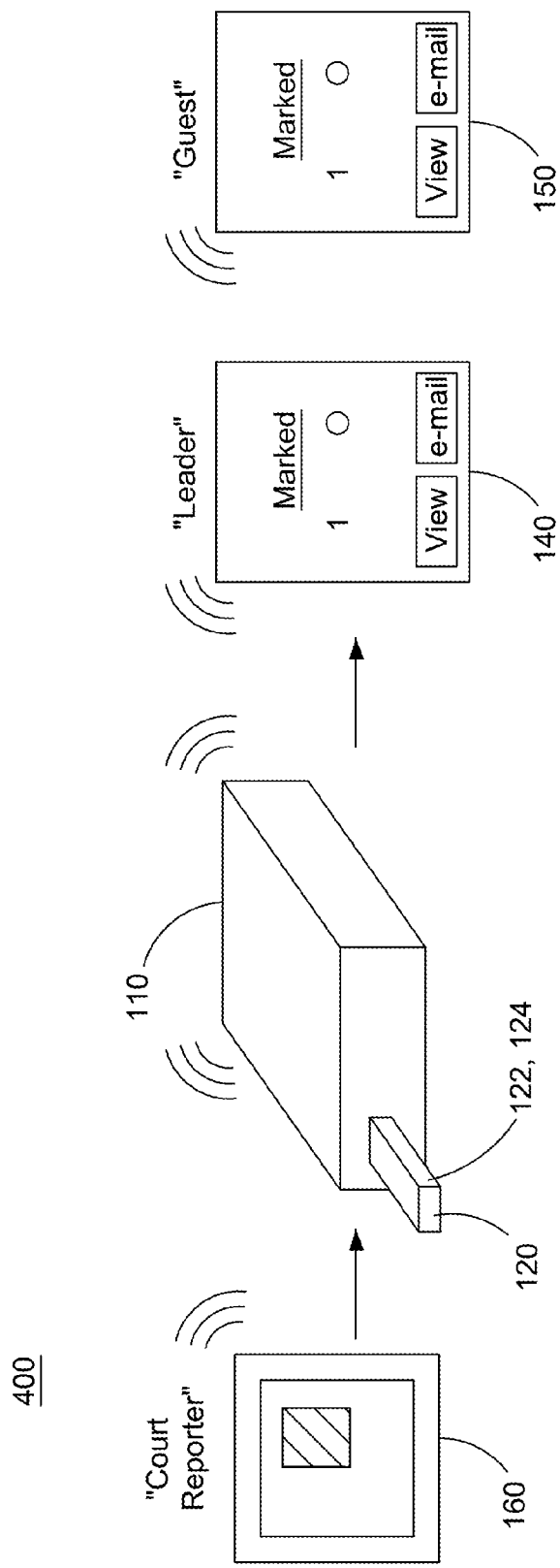

FIGS. 3 and 4 illustrate a series of steps 300 and 400, respectively, for utilizing aspects of a local, paperless document sharing, editing, and marking system, according to an embodiment.

Step 1 indicates that a leader's device 140 contains documents 1, 2, and 3 that may be shared. At this point, no documents are yet shared with the guest device 150 and the court reporter device 160. The secure, local network is established via the router 110.

At step 2, the leader selects documents 1 and 3 for sharing, which via the local, secure network are shared to the guest device 150 and the court reporter device 160. In an embodiment, the guest selects which shared documents are to be downloaded, while the documents are automatically downloaded to the court reporter device 160. The court reporter is able to select a document for marking (in this example, document 1) as shown at step 3.

Figure 5:
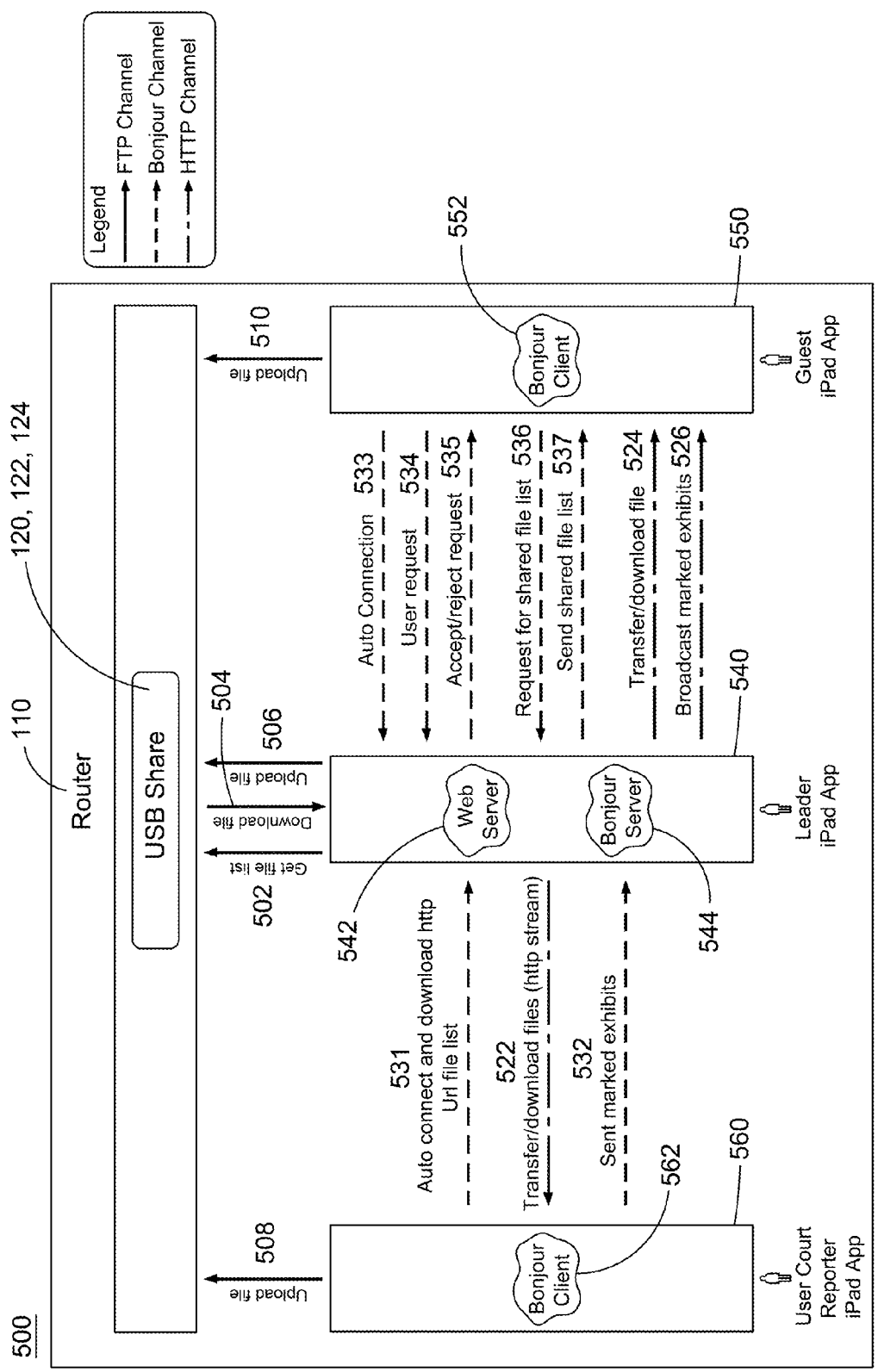
FIG. 5 is an application flow diagram of a local, paperless document sharing, editing, and marking system, according to an embodiment.

FIG. 5 is an application flow diagram 500 of a local, paperless document sharing, editing, and marking system, according to an embodiment. The router 110 and the connected document storage device 120/122, 124 are shown communicating over FTP channels 502, 504, 506, 508, and 510 with user applications 540 (leader), 550 (guest), and 560 (court reporter). Other secure communication channels may be used. A web server 542 and a bonjour server 544 (or a like server) is part of the leader application 540. The guest application 550 comprises a bonjour client 552 (or a like client), as does the court reporter application 560 (i.e., bonjour client 562). Bonjour channels (or the like) and HTTP channels (or the like) are used for communicating between the user applications 540, 550, 560.

The following data flow occurs over the channels as indicated in FIG. 5: the leader application 540 transmits "get file list" 502 and "upload file" 506 requests to the connected document storage device 120/122, 124, which transmits "download file" 504 to the leader application 540. The guest application 550 and the court reporter application 560 communicate "upload file" requests 510 and 508, respectively, to the document storage device 120/122, 124.

Over a bonjour channel (or the like), "auto connect and download file list" 531 and "send marked exhibits" 532 are communicated from the court reporter application 560 to the leader application 540. "Transfer/download files" 522 is transmitted between the leader application 540 and the court reporter application 560 over an HTTP channel (or the like).

Over a bonjour channel (or the like), "auto connection" 533 and "user request" 534 are transmitted from the guest application 550 to the leader application 540, which responds with an "accept/reject request" 535. The guest application 550 also transmits, over a bonjour channel or the like, to the leader application 540 a "request for shared file list" 536. The leader application 540, utilizing a bonjour channel or the like between the bonjour server 544 and the bonjour client 552, responds with "send shared file list" 537. "Transfer/download files" 524 and "broadcast marked exhibits" 526 is transmitted between the leader application 540 and the guest application 550 over an HTTP channel (or the like).

Figure 6:
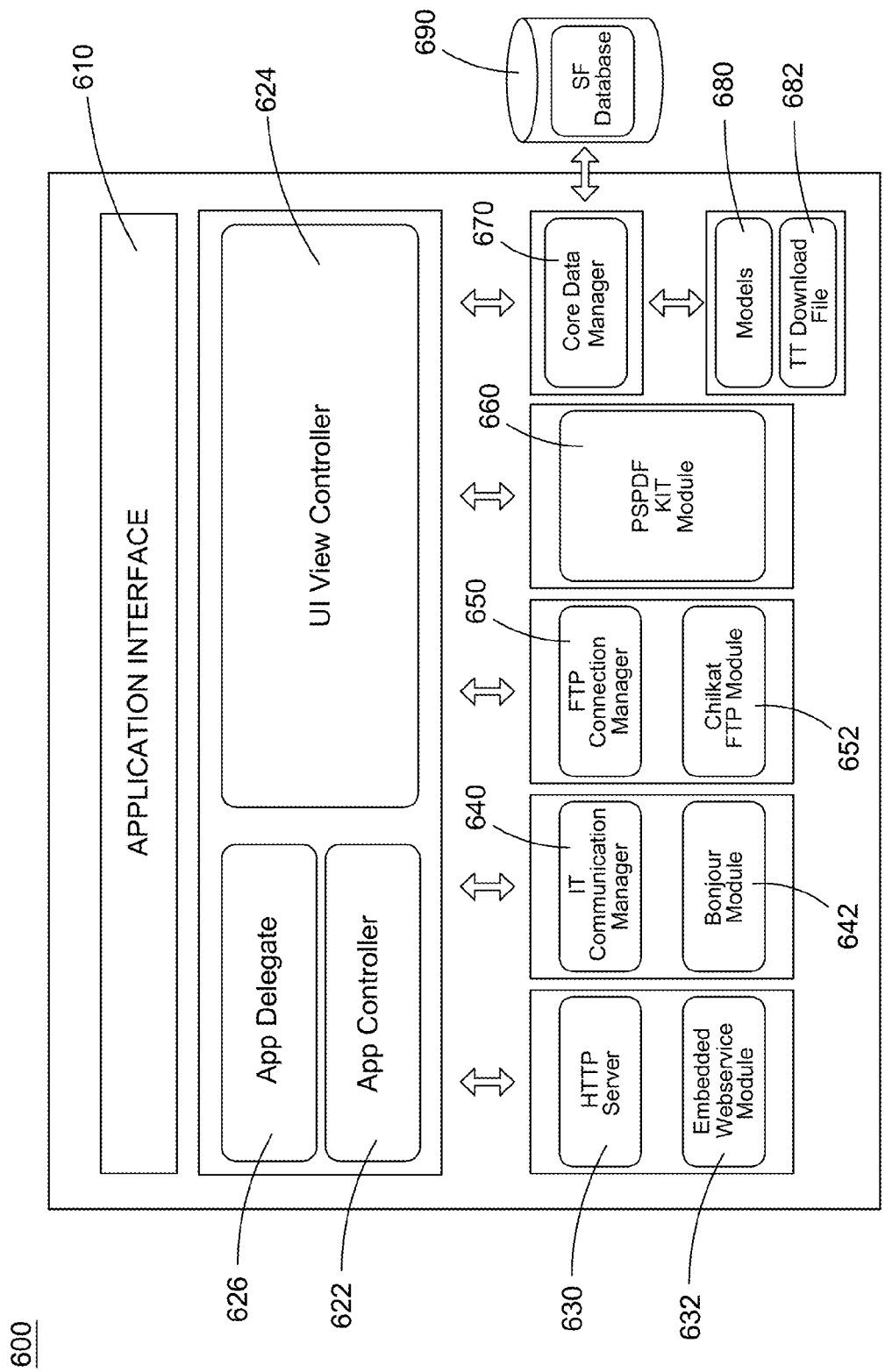
FIG. 6 is an architecture diagram of a local, paperless document sharing, editing, and marking system, according to an embodiment.

FIG. 6 is an architecture diagram 600 of an application for a local, paperless document sharing, editing, and marking system, according to an embodiment. The application includes an application interface 610 for user input and output of data. An application delegate 626 handles the launch of the application. An application controller 622 handles the user interface; for example, the application controller 622 decides the screens to be loaded. A user interface (UI) controller 624 is responsible for reading data from user inputs and providing required outputs.

HTTP server 630 is used to create a web server on the device of the leader for creating files download URL for downloading by the guest and/or court reporter (i.e., the participants). Embedded webservice module 632 is a module used for web server creation.

IT communication manager 640 handles bonjour module 642 for handling user communications. A leader user can create a bonjour server with other participants acting as clients, allowing users to send/receive messages from each other.

FTP connection manager 650 manages FTP connections, allowing for downloads and uploads of data. Chilkat FTP module 652 is used for FTP services.

PSPDF kit module 660 is a third party module for editing files.

Core data manager 670 maintains context to SF database 690 and provides data to UI view controller 624.

Models 680 maintain the downloaded files' information, such as name, date, type, file path, etc. TT download files 682 is a database communicated for user downloads and user saves.

FIGS. 7-26 are exemplary screenshots of a graphical user interface (GUI) for a local, paperless document sharing, editing, and marking system, according to an embodiment. According to an embodiment, FIGS. 7-17 are screenshots showing a leader GUI for a leader of a document sharing session, FIGS. 18-21 are GUIs for a guest of the document sharing session, and FIGS. 22-26 are GUIS for a court reporter.

Figure 7:
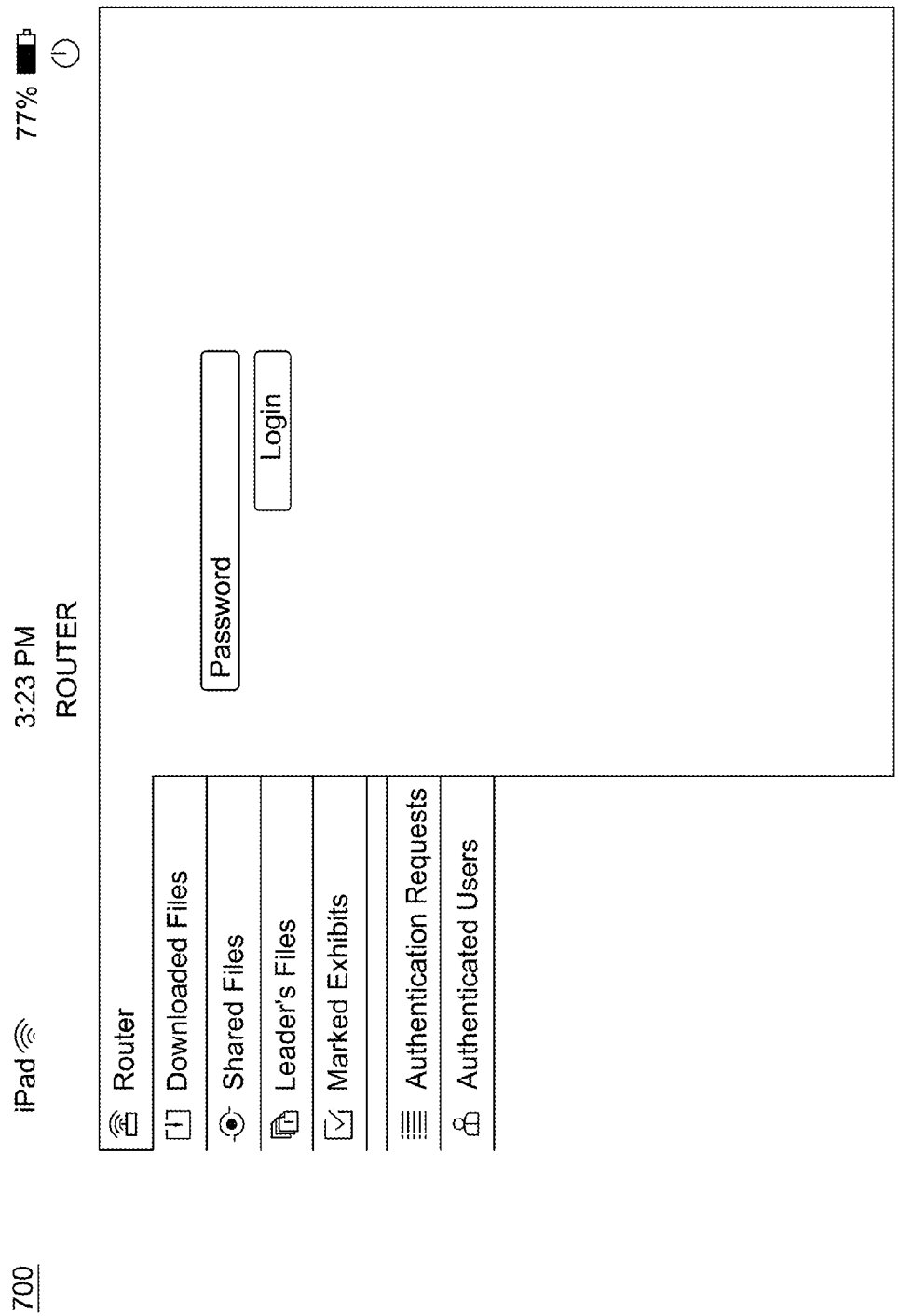

Screen 700, shown in FIG. 7, is an exemplary home screen shown to the leader on the leader's device (e.g., tablet, computer, wireless device). The home screen displays the Router menu option by default, although in other embodiments other menu options may be the default home screen. Other menu options available to the leader include Authentication Requests, Authenticated Users, Downloaded Files, Shared Files, Leader's Files, and Marked Exhibits.

According to an embodiment, Wi-Fi selection is made on the user device's settings, and, unless the user manually selects another Wi-Fi connection from the settings, the current selection will persist. Once the password is entered, according to an embodiment, it is saved on the device and the user is not required to specify it again unless s/he logs out of the session. Upon tapping or selecting "Login", all of the files (or documents) that are currently available on the document storage device 120/122, 124 connected to the router 110 will be shown using a secure FTP channel.

Screen 800, shown in FIG. 8, allows for downloading files (e.g. documents) using the router 110. The leader may select the corresponding checkboxes/circles of desired files to download or select the "Select All" box. Upon selecting or tapping "Download", the files are downloaded and added to the list displayed in the Downloaded Files menu option.

Screen 900, shown in FIG. 9, is an exemplary screen for the Authentication Requests menu option. The screen 900 shows the list of authentication requests sent by the guests. In an embodiment, the list is of requests sent by guest users, as the court reporter is automatically authenticated. The screen 900 allows for "Accept" or "Reject" of the requests.

Figure 10:
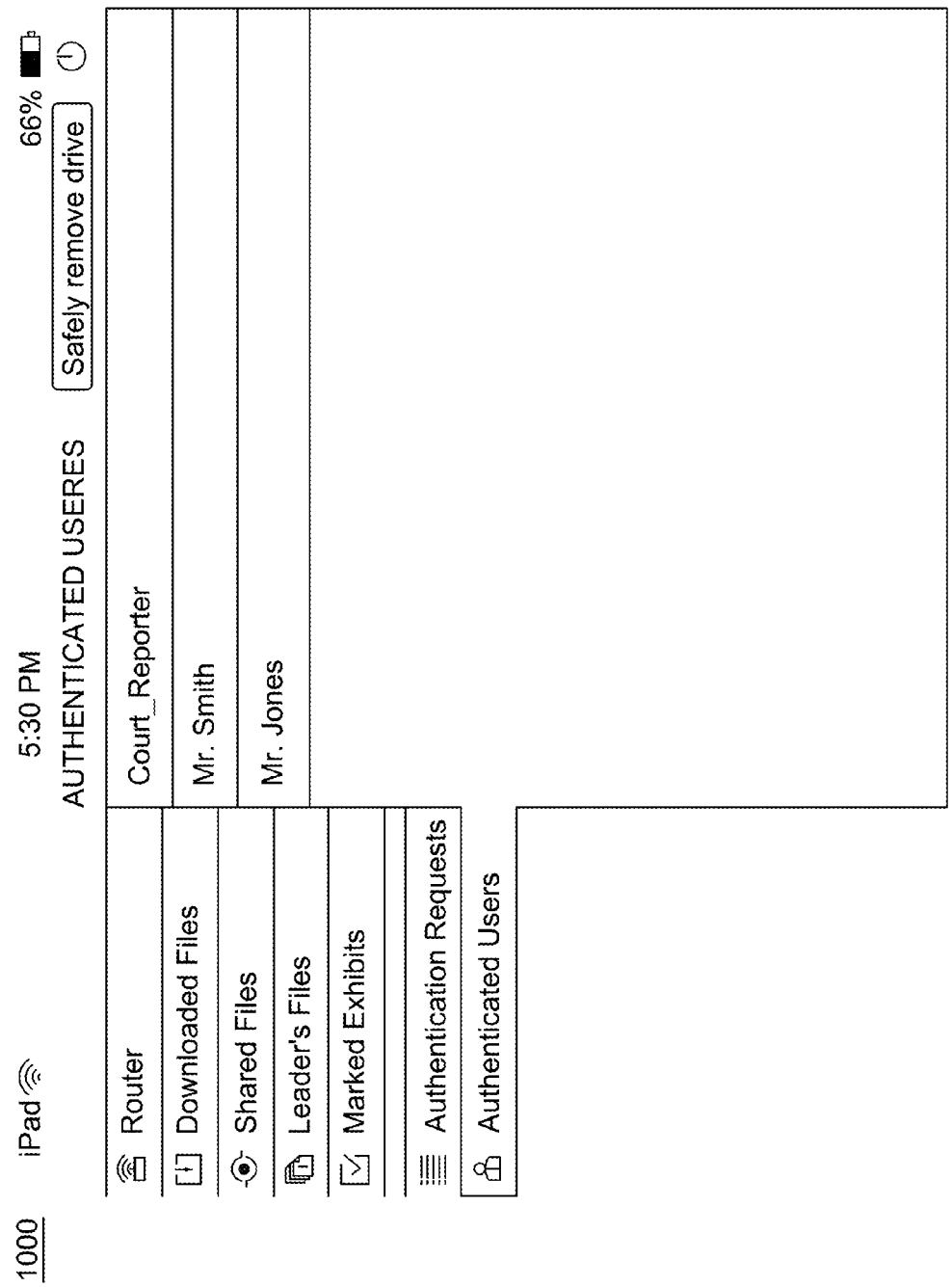

Screen 1000, shown in FIG. 10, is an exemplary screen for the Authenticated Users menu option. The screen 1000 shows a listing of authenticated users.

Figure 11:
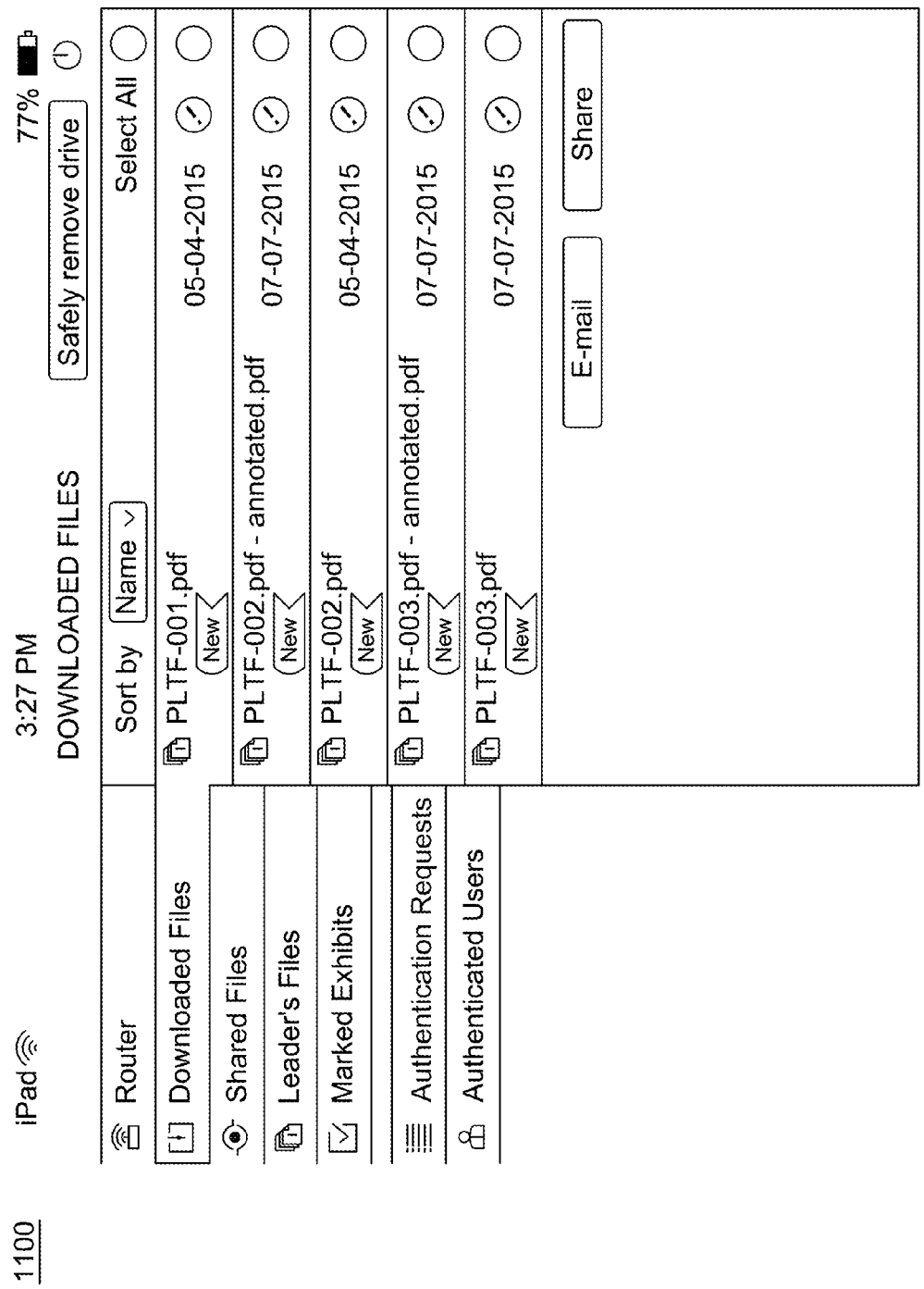

Screen 1100, shown in FIG. 11, is an exemplary screen for the Downloaded Files menu option. The screen 1100 shows a listing of files downloaded by the leader from the document storage device 120/122, 124. From the screen 1100, the leader can view, edit, and share files to authenticated users. The files can also be emailed and/or saved to the document storage device 120/122, 124. When files are downloaded, the following information may be captured automatically for each filed: Type, Size, Date, Marked, and Name. The same parameters can be used as sorting options in the application. To sort the downloaded files by any of these options, the "Sort" option may be tapped or selected, and the desired parameter may be selected. The screen 1100 allows for sharing and emailing of selected ones of the downloaded files. To email the downloaded files, internet access is required and the leader is prompted to enter the desired email addresses of the recipients.

Screen 1200 of FIG. 12 shows an example document selected from the downloaded files listed in the Downloaded Files menu option (screen 1100). The document may be viewed, searched, and/or bookmarked. While in the document, the leader can edit, save, rename, and/or close the document. Other options may be available.

Figure 13:
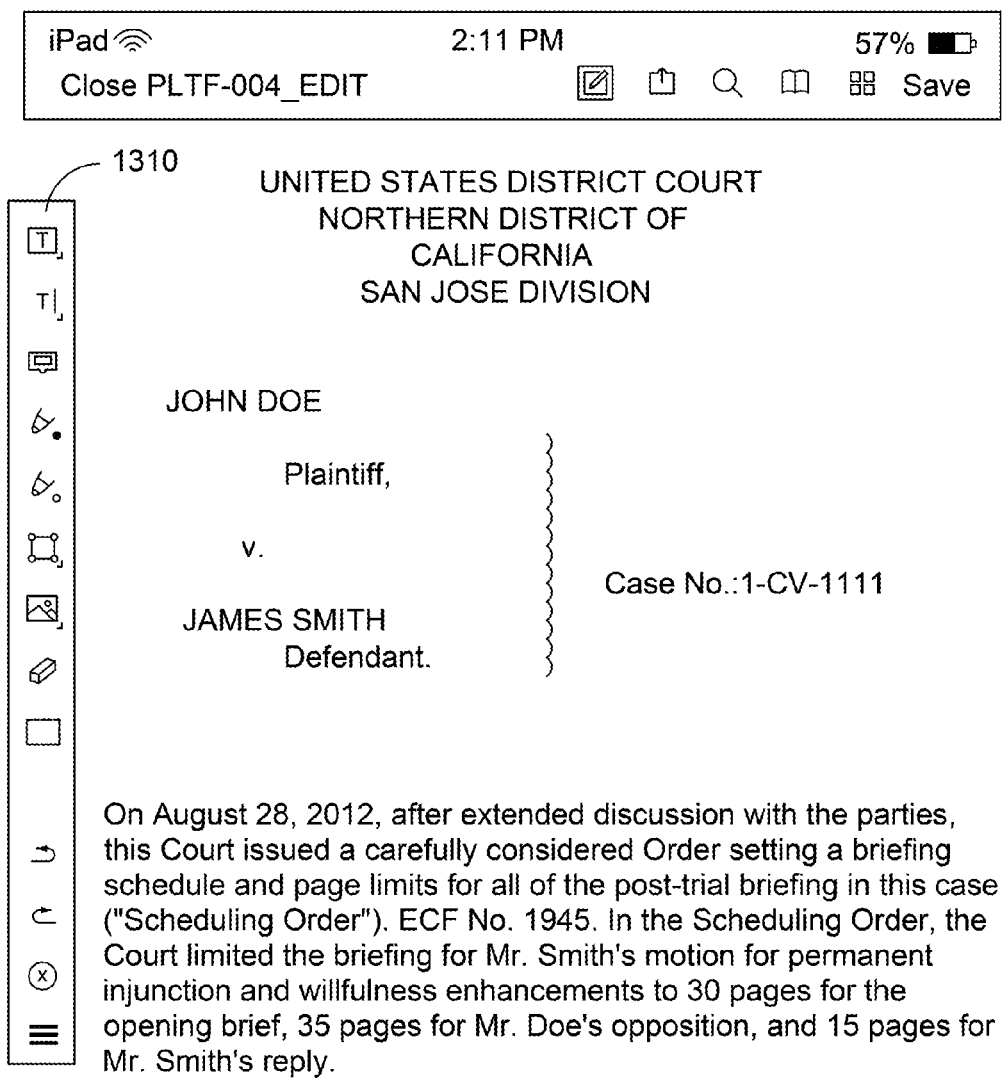

FIG. 13 provides an example of editing of the document shown in FIG. 12 by selection of an edit button. A toolbar 1310 is provided for the editing of the document. The toolbar 1310 may be provided from a standard plug-in available for editing documents. Edited files are, in an embodiment, saved in a listing shown in the Leader's Files menu option.

Figure 14:
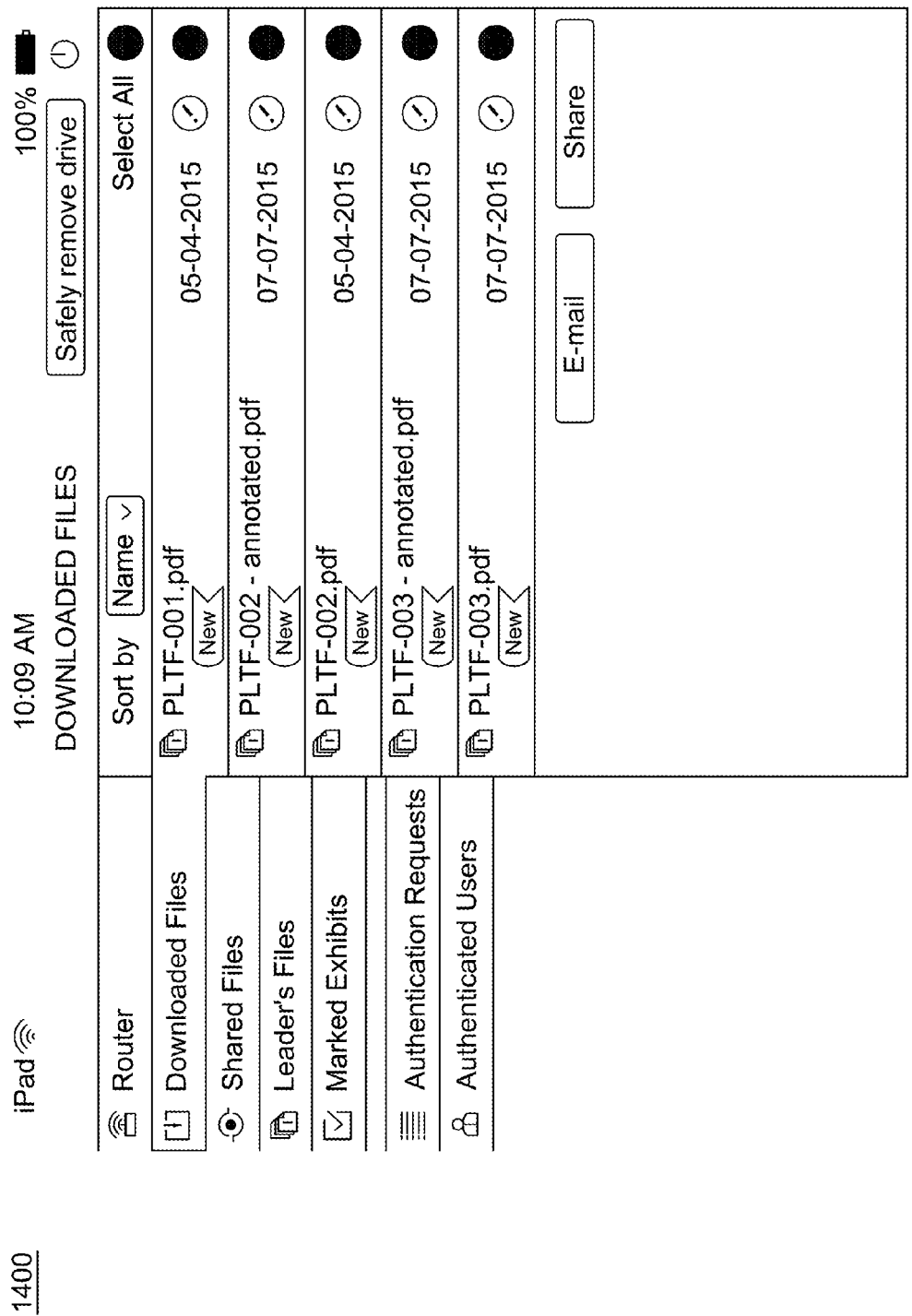

Screen 1400, shown in FIG. 14, represents selection of files to be shared in the Downloaded Files menu option. Upon selection of the desired files, selection of the "Share" button results in the selected files becoming available to the other participants. In an embodiment, an option is provided for sharing documents with selected participants, such as a court reporter. In an embodiment, the court reporter can mark the shared document as an exhibit and share it with the leader or with the leader and guests. In another embodiment, options are provided for deleting files.

Figure 15:
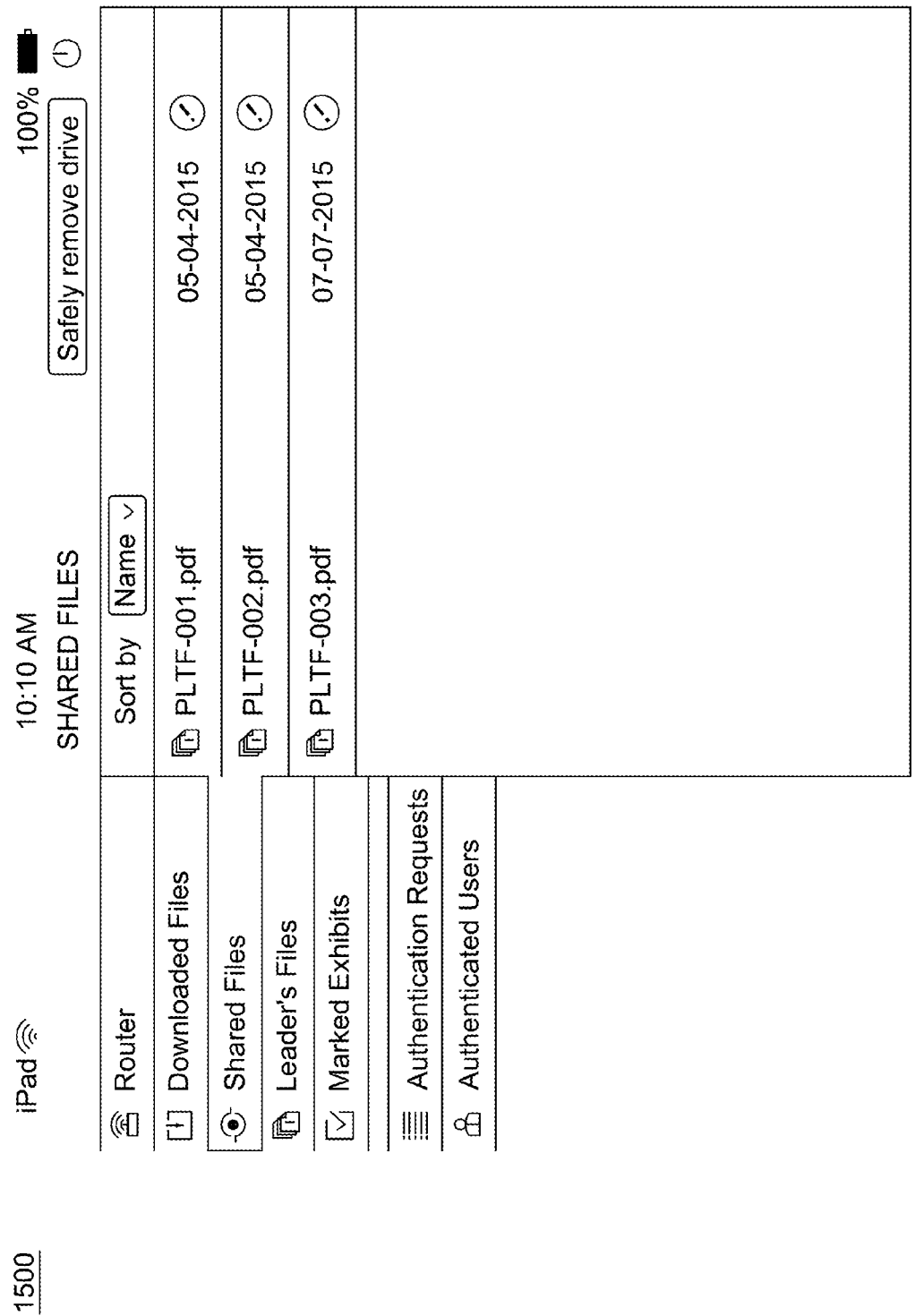

Screen 1500, shown in FIG. 15, is an exemplary screen for the Shared Files menu option. From the screen 1500, the leader can view, edit, and delete the shared files. If, according to an embodiment, the leader deletes a file from the shared files listing, the file may be automatically deleted for one or more of the participants (e.g., the deleted file may be retained for the court reporter).

Figure 16:
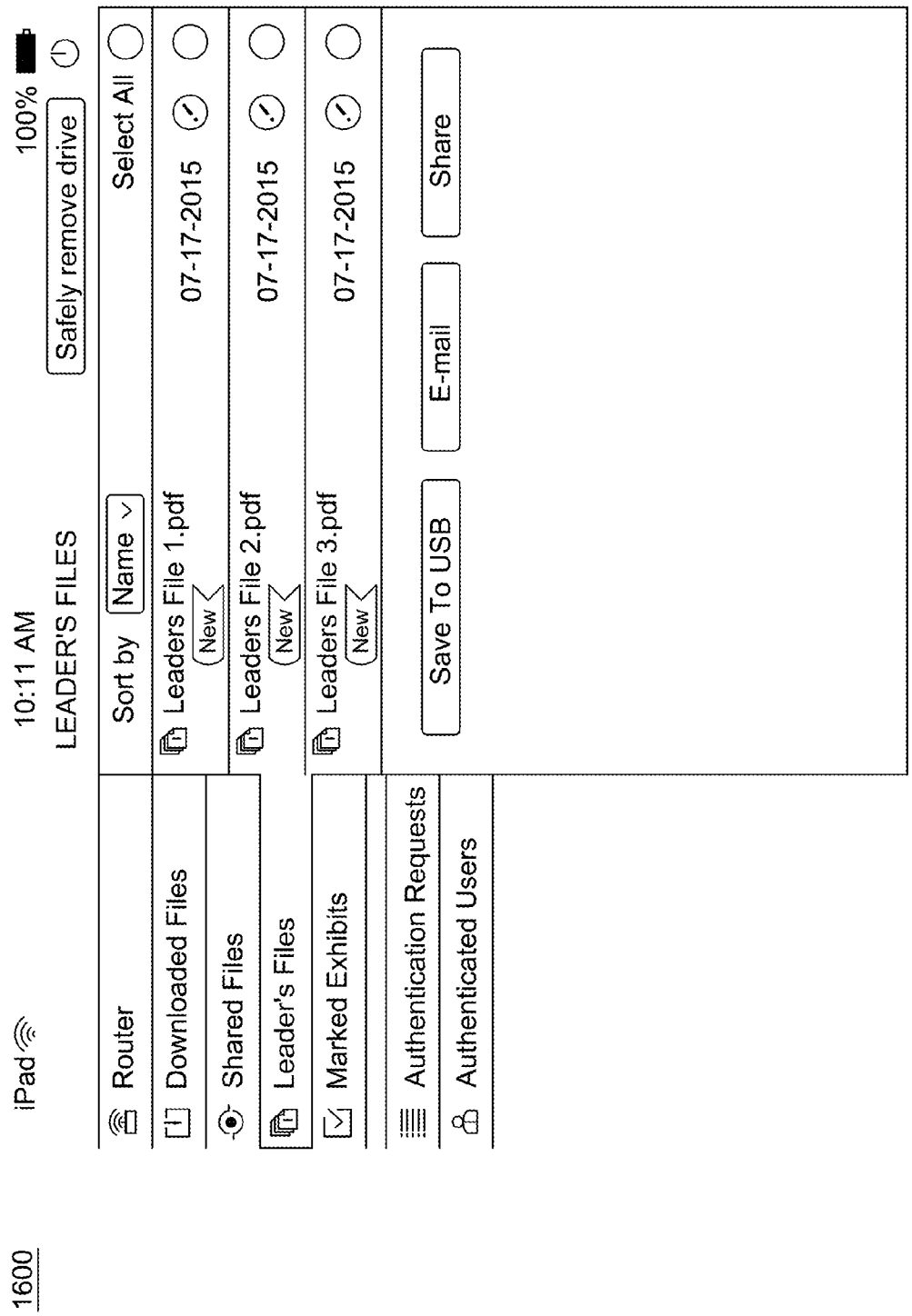

Screen 1600, shown in FIG. 16, is an exemplary screen for the Leader's Files menu option. The screen 1600 includes a listing of those files that are edited and saved by the leader. The leader can view, edit, email, delete, save, and share the files. When a file is shared, a notification message may be provided to one or more of the participants.

Figure 17:
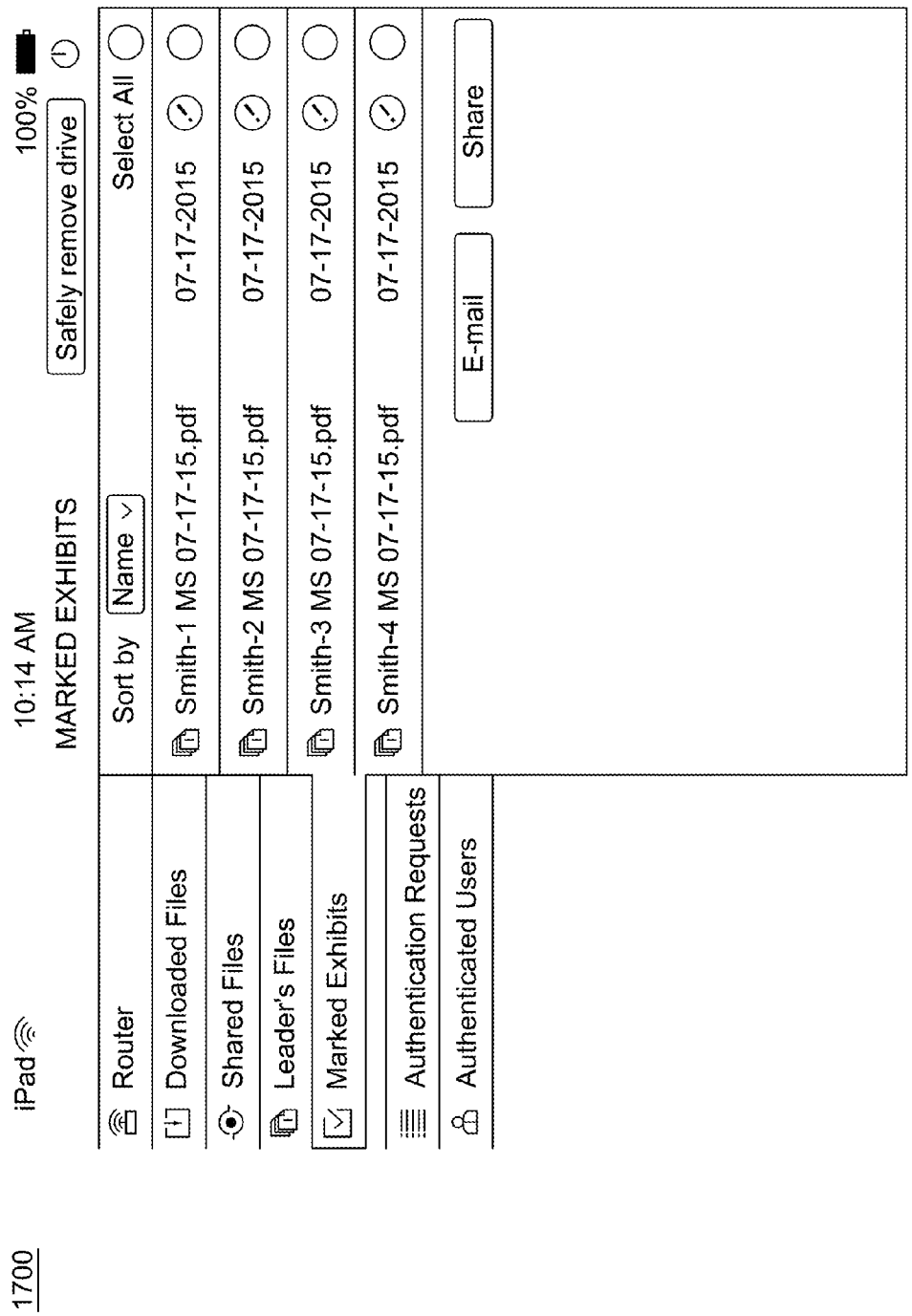

Screen 1700, shown in FIG. 17, is an exemplary screen for the Marked Exhibits menu option. The screen 1700 includes a listing of those files or documents that are marked by the court reporter. Using the screen 1700, the leader can view, edit, share, and save the marked exhibits.

Figure 18:
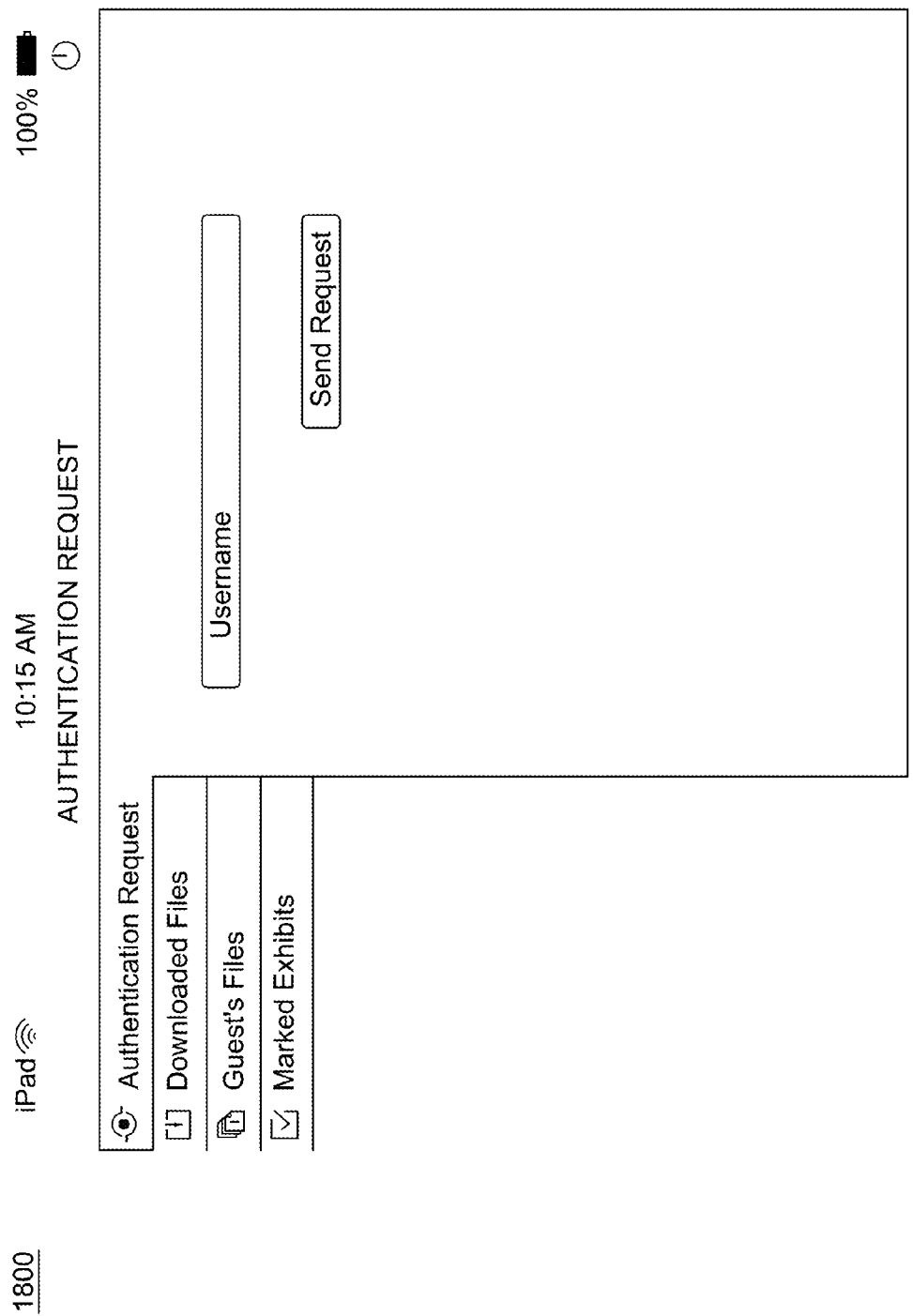

Screen 1800, shown in FIG. 18, is an exemplary home screen for a guest for the Authentication Request menu option, allowing a guest to send an authentication request to join the session started by a leader. The guest may, according to an embodiment, be notified of acceptance or rejection in, for example, a pop-up window.

Figure 19:
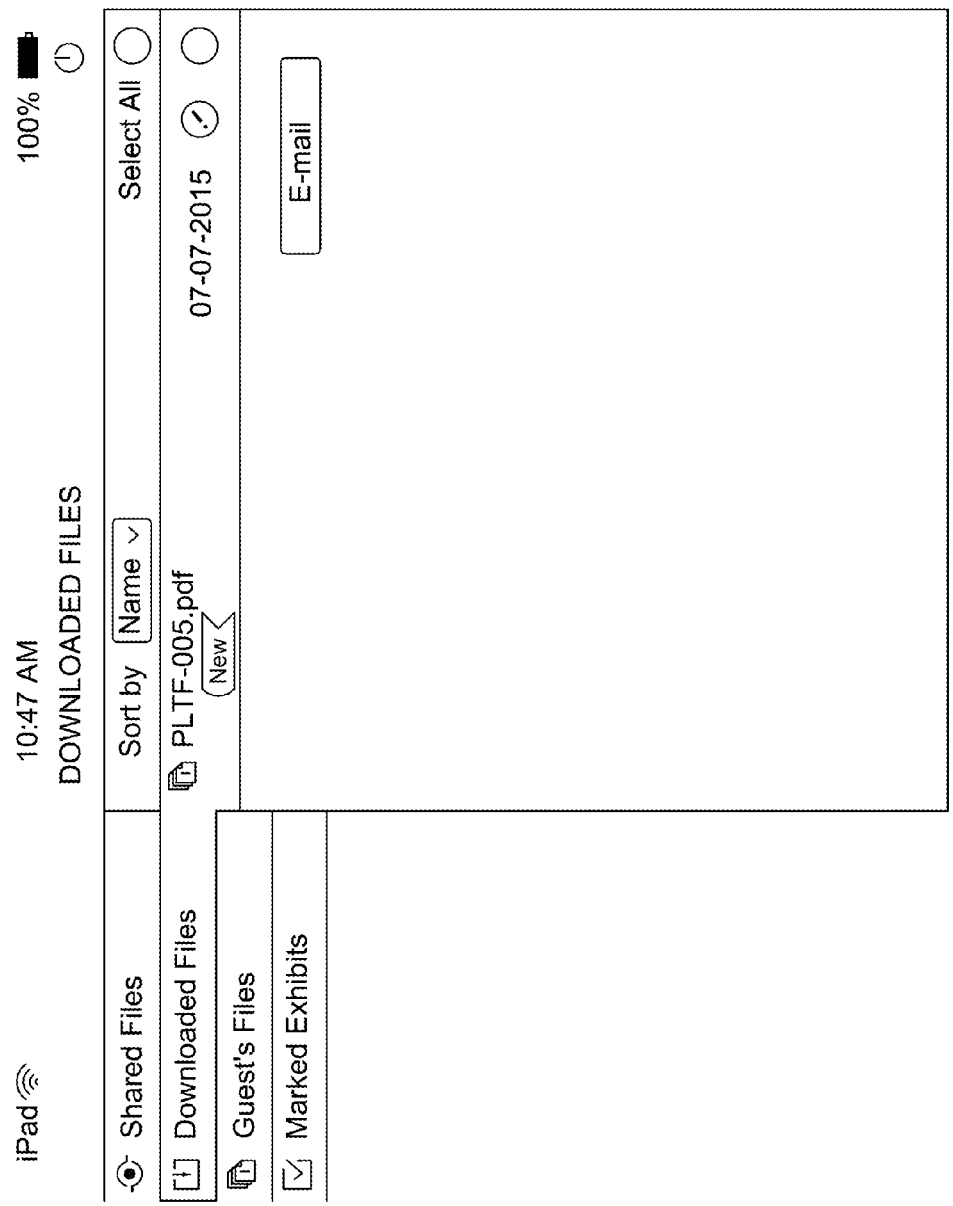

Screen 1900, shown in FIG. 19, is an exemplary screen for the Downloaded Files menu option for a guest. The screen 1900 includes a listing of those files or documents that are shared by the leader and downloaded (from a Shared Files menu). Using the screen 1900, the guest can view, edit, save, and email the downloaded files. In an embodiment, when a file or document is recently (i.e., within a predefined time limit, such as, for example two minutes) shared by the leader, a "new" identifier may be provided near or next to the document name. In an embodiment, when a guest is selecting documents to be downloaded from the Shared Files menu option, a "Download and View" button may be provided for downloading the document and then automatically opening the document for viewing and editing, if desired.

Screen 2000, shown in FIG. 20, is an exemplary screen for the Marked Exhibits menu option. The screen 2000 includes a listing of those files or documents that are marked by the court reporter. Using the screen 2000, the guest can view, edit (e.g., add annotations), save, and email the marked exhibits.

Figure 21:
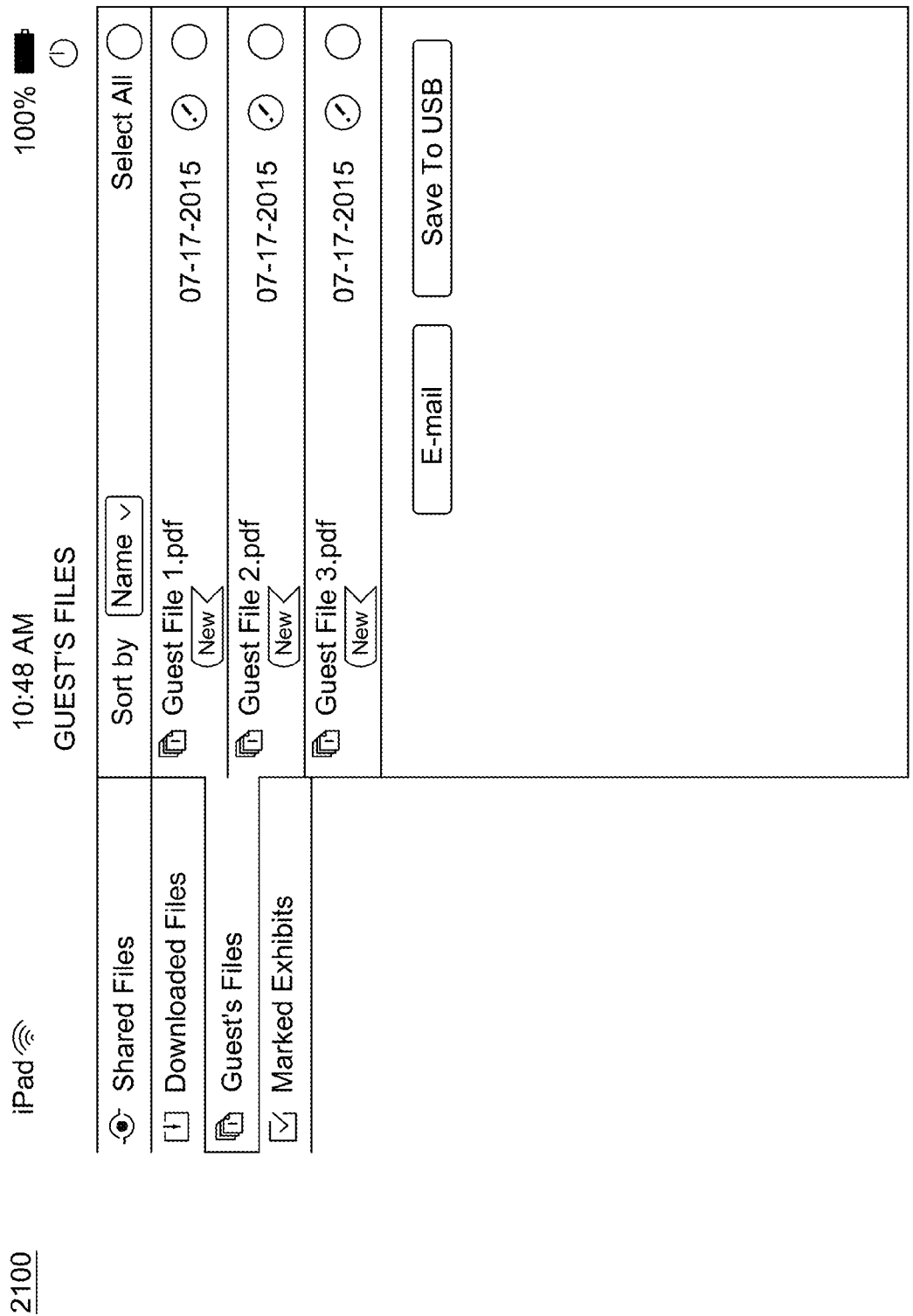

Screen 2100, shown in FIG. 21, is an exemplary screen for the Guest's Files menu option. Using the screen 2100, the guest can view, edit, save, and email the edited files.

Figure 22:

Screen 2200, shown in FIG. 22, is an exemplary screen for the Downloaded Files menu option for a court reporter. The screen 2200 includes a listing of those files or documents that are shared by the leader and downloaded. In an embodiment, shared files are automatically downloaded for a court reporter to his or her device 160. Using the screen 2200, the court reporter can sort, view, and mark the downloaded files as exhibits. In an embodiment, when a file or document is recently (i.e., within a predefined time limit, such as, for example two minutes) shared by the leader, a "new" identifier may be provided near or next to the document name.

Figure 23:

Screen 2300, shown in FIG. 23, is an exemplary screen for the Exhibit Sticker menu option for the court reporter. The court reporter can select an option from "Plaintiff's Exhibit," "Defendant's Exhibit," or an editable exhibit box. The relevant information can be entered in the screen 2300 for customizing the exhibit sticker, and exhibit numbers can be automatically incremented upon the "Auto Increment" button selection. In other embodiments, depending upon the environment in which the document sharing session is being utilized, other options for adding information (e.g., data, identifiers, annotations) to documents may be provided.

Screen 2400 of FIG. 24 shows an example document (selected from the downloaded files listed in the Downloaded Files menu option (screen 2200)) that may be marked. While in the document, the court reporter has the option to place an exhibit sticker by selection or tapping of the sticker icon 2410. Upon selection, the exhibit sticker automatically appears and can be resized and moved on the document. A select range icon 2420 allows the court reporter to mark selected pages (e.g., a range of pages or a single page among several to be marked as an exhibit). The marked exhibit can be saved and shared with the leader or leader and guests, in an embodiment. Screen 2500 of FIG. 25 shows an example document that is marked (2510) with options icon 2520.

Screen 2600, shown in FIG. 26, is an exemplary screen for the Marked Exhibits menu option for the court reporter. After a file is marked as an exhibit, the document is moved to the listing shown in the Marked Exhibits menu option. The files may be emailed and/or saved. In an embodiment, when a document is marked as an exhibit by a court reporter, a "Marked" identifier will appear next to or near the document name in the Shared Files menu for the leader and the guest or guests. The "Marked" identifier may include a flag, an exhibit number, or a label containing "marked" and the exhibit number. Other identifiers may be used. In an embodiment, if the court reporter swipes left on an exhibit, the exhibit will be deleted from the Marked Exhibits tab, and will also be deleted from leader's and guests' Marked Exhibits tabs when those tabs are refreshed. A delete button or the like may also be provided for allowing the court reporter to delete selected marked exhibits.

The screenshots of a GUI for a local, paperless document sharing, editing, and marking system, as shown in FIGS. 7-26, are purely exemplary and non-limiting. The example screenshots are intended to illustrate the capabilities of the local, paperless document sharing, editing, and marking system described herein. Additional menu options, formatting options, and editing options, for example, may be provided. Moreover, as described above, the legal deposition environment is just one example of an environment in which the system can be used.

The local, paperless document sharing, editing, and marking system, described herein, provides all of the benefits and more of having paper documents at a deposition. Any document can be easily read. Marked documents are shared with each participant. Every participant can leave a deposition with a complete list of all the shared and marked exhibits used at the deposition. As a document is marked electronically, a guest can leave with a set of clean and annotated exhibits. In addition to documents, any types of files such as video or audio files can be shared, accessed, and used with the system as described herein.

A leader can attach any size drive to the router. They could easily have a terabyte or more worth of documents available to them via the local network. They can have two (or more) sets of documents, a clean version to distribute to the guests and a private, marked-up version from which they can ask questions. Since a local network provided by a specific router is used, users are assured of a fast connection. For example, a 10 Mb document that could take two minutes or more to download over a broadband connection, takes under 10 seconds via the router.

The amount of time and effort a deposing attorney needs to spend preparing is also reduced. All documents in a case can be put into a series of browsable folders prior to the deposition. No additional uploading of documents to a cloud service is needed. Thus a practically unlimited number of documents can be accessed by a deposing attorney without consideration of hosting fees, downloading fees, or "cloud" taxes. The system has a number of passwords needed to access the session, resulting in a very secure document sharing system. The documents are stored locally. An attorney does not need to worry about an outside company's document protection safeguards.

The local, paperless document sharing, editing, and marking system, according to embodiments provided herein, combines hardware and software into one system. The idea of using existing hardware provided by a router and storage media has not previously been contemplated by software writers. Hardware manufacturers do not typically write software specifically for the legal field to take advantage of their capabilities.

As stated above, although embodiments herein are described with respect to a legal, and in particular a deposition, environment, the system is not limited to such an environment. Instead, the system is applicable for any environment in which users wish to securely share documents or files (e.g., audio or video) with one another or with multiple participants during a secure session.

It will be appreciated that the above description and accompanying figures provide exemplary, non-limiting configurations. Although the present invention has been described with reference to these exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The invention claimed is:

1. A system for allowing a plurality of user devices to connect to share, view, edit, mark, and save documents over a local network, the system comprising:
   a router configured to create the local network between the plurality of user devices, the plurality of user devices comprising a leader device authenticated by the router and one or more participant devices approved by the leader device to join the local network;
   a document storage device connected to the router and containing thereon one or more documents;
   wherein the router and the document storage device are configured to provide access to the one or more documents contained on the document storage device when an application installed on the plurality of user devices is run, the application configured to provide a leader graphical user interface (GUI) on the leader device for allowing leader manipulation of at least one of the one or more documents and sharing of at least one of the one or more documents, and a participant GUI on the one or more participant devices for allowing participant manipulation of at least one of the shared documents;
   wherein the participant GUI is based upon one or more predefined participant types, each participant type provided with a specified functionality in a corresponding participant GUI;
   wherein a first predefined participant type comprises a court reporter, wherein a corresponding court reporter GUI comprises one or more windows for customizing exhibit stickers, saving exhibit stickers, marking and saving one or more of the at least one of the shared documents, and sharing one or more of the at least one of the shared documents; and
   wherein a second predefined participant type comprises a guest user, wherein a corresponding guest user GUI comprises one or more windows for selecting, editing, saving, sharing, downloading, and viewing one or more of the at least one of the shared documents.

2. The system of claim 1, wherein the leader device authentication by the router comprises verification of a secure password specific to the router.

3. The system of claim 1, wherein the local network comprises a wireless network broadcasted by the router, and wherein the document storage device is preconfigured for access of the one or more documents.

4. The system of claim 1, wherein leader manipulation of at least one of the one or more documents comprises one or more of selecting, editing, annotating, saving, downloading, and viewing the at least one of the one or more documents.

5. The system of claim 1, wherein the leader GUI comprises one or more windows for one or more of selecting, editing, saving, sharing, downloading, and viewing the at least one of the one or more documents.

6. The system of claim 1, wherein participant manipulation of the at least one of the shared documents comprises one or more of selecting, editing, annotating, saving, downloading, and viewing the at least one of the shared documents.

7. A computer-implemented method for allowing a plurality of user devices to connect to share, view, edit, mark, and save documents over a local network, the method comprising:
creating, via a router, the local network between the plurality of user devices, the plurality of user devices comprising a leader device and one or more participant devices approved by the leader device to join the local network;
connecting to the router a document storage device containing thereon one or more documents;
authenticating, by the router, the leader device;
providing, by the router and the document storage device, access to the one or more documents contained on the document storage device when an application installed on the plurality of user devices is run, the application configured to provide a leader graphical user interface (GUI) on the leader device for allowing leader manipulation of at least one of the one or more documents and sharing with the participant devices of at least one of the one or more documents, and a participant GUI on the one or more participant devices for allowing participant manipulation of at least one of the shared documents;
wherein the participant GUI is based upon one or more predefined participant types, each participant type provided with a specified functionality in a corresponding participant GUI;
wherein a first predefined participant type comprises a court reporter, wherein a corresponding court reporter GUI comprises one or more windows for customizing exhibit stickers, saving exhibit stickers, marking and saving one or more of the at least one of the shared documents, and sharing one or more of the at least one of the shared documents; and
wherein a second predefined participant type comprises a guest user, wherein a corresponding guest user GUI comprises one or more windows for selecting, editing, saving, sharing, downloading, and viewing one or more of the at least one of the shared documents.

8. The method of claim 7, wherein authenticating, by the router, the leader device comprises verifying a secure password specific to the router, the secure password entered by a user of the leader device.

9. The method of claim 7, wherein the local network comprises a wireless network broadcasted by the router, wherein the document storage device is preconfigured for access of the one or more documents.

10. The method of claim 7, wherein leader manipulation of at least one of the one or more documents comprises one or more of selecting, editing, annotating, saving, downloading, and viewing the at least one of the one or more documents.

11. The method of claim 7, wherein the leader GUI comprises one or more windows for one or more of selecting, editing, saving, sharing, downloading, and viewing the at least one of the one or more documents.

12. The method of claim 7, wherein participant manipulation of the at least one of the shared documents comprises one or more of selecting, editing, saving, annotating, downloading, and viewing the at least one of the shared documents.

* * * * *